United States Patent [19]

Douglas et al.

[11] Patent Number: 5,005,844
[45] Date of Patent: Apr. 9, 1991

[54] TRAVOIS WITH ROLLER ASSEMBLY

[75] Inventors: George V. Douglas; Vivian T. Douglas, both of Wheat Ridge, Colo.

[73] Assignee: Douglas & Douglas, Inc., Denver, Colo.

[21] Appl. No.: 351,724

[22] Filed: May 15, 1989

Related U.S. Application Data

[63] Continuation-in-part of Ser. No. 130,078, Dec. 8, 1987, Pat. No. 4,838,565.

[51] Int. Cl.$^5$ .......................................... B62D 51/004
[52] U.S. Cl. ..................................... 280/1.5; 172/350; 172/353; 224/184; 280/78; 403/118
[58] Field of Search .................... 280/1.5, 78; 172/350, 172/353; 224/184; 403/118

[56] References Cited

U.S. PATENT DOCUMENTS

| | | | |
|---|---|---|---|
| 1,040,413 | 10/1912 | Renard | 224/153 |
| 2,613,953 | 10/1952 | Giovannoni | 280/1.5 |
| 2,624,588 | 1/1953 | Jones | 280/9 |
| 2,655,957 | 10/1953 | Lagant | 30/388 |
| 2,992,834 | 7/1961 | Tidwell et al. | 280/47.3 |
| 3,046,031 | 7/1962 | Reynolds | 280/8 |
| 3,328,043 | 6/1967 | Johnson | 280/1.5 |
| 3,336,037 | 8/1967 | Brozovich | 280/9 X |
| 4,045,040 | 8/1977 | Fails | 280/1.5 |
| 4,236,723 | 12/1980 | Lemmon | 280/1.5 |

FOREIGN PATENT DOCUMENTS

| | | | |
|---|---|---|---|
| 723375 | 8/1942 | Fed. Rep. of Germany | 280/1.5 |
| 36994 | 7/1968 | Finland | 172/537 |
| 356992 | 10/1961 | Switzerland | 280/1.5 |
| 8600054 | 1/1986 | World Int. Prop. O. | 280/1.5 |

Primary Examiner—Mitchell J. Hill
Attorney, Agent, or Firm—Bill D. McCarthy; Glen M. Burdick

[57] ABSTRACT

A rolling travois for carrying camping supplies and the like, the rolling travois comprising an elongated support frame mounted over an enlarged roller assembly having a spherically shaped profile. A pair of pushing handles extend rearward and upward from the travois, and a pair of pulling handles are mounted on the forward end. Attached to the pulling handles is a pulling harness which is connectable to an individual.

3 Claims, 5 Drawing Sheets

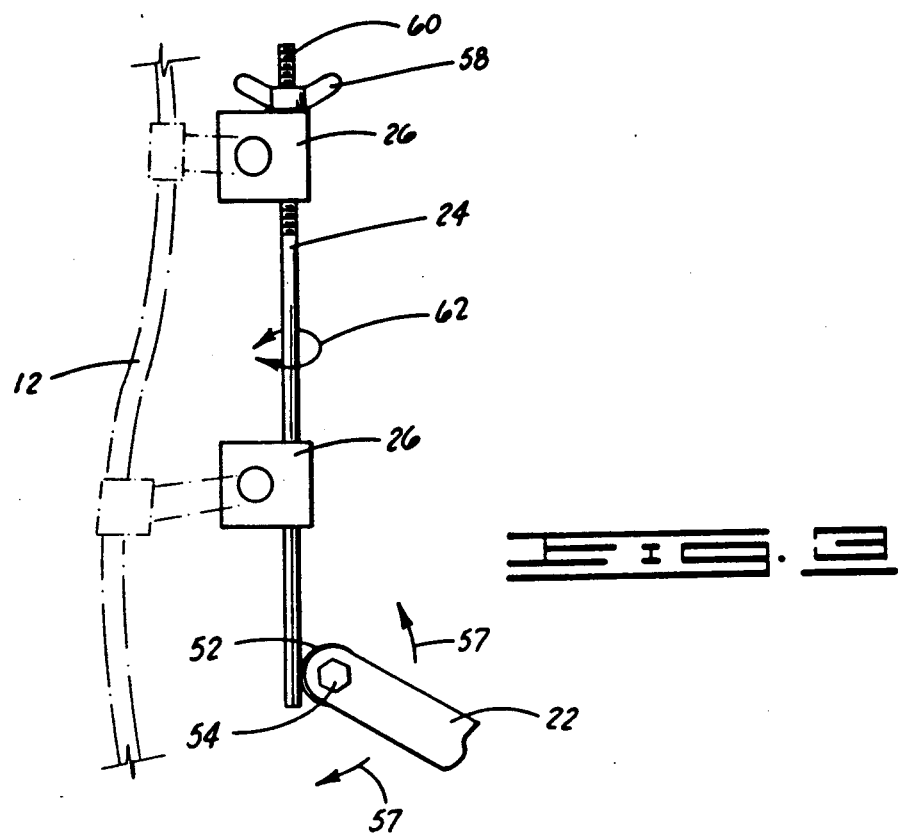
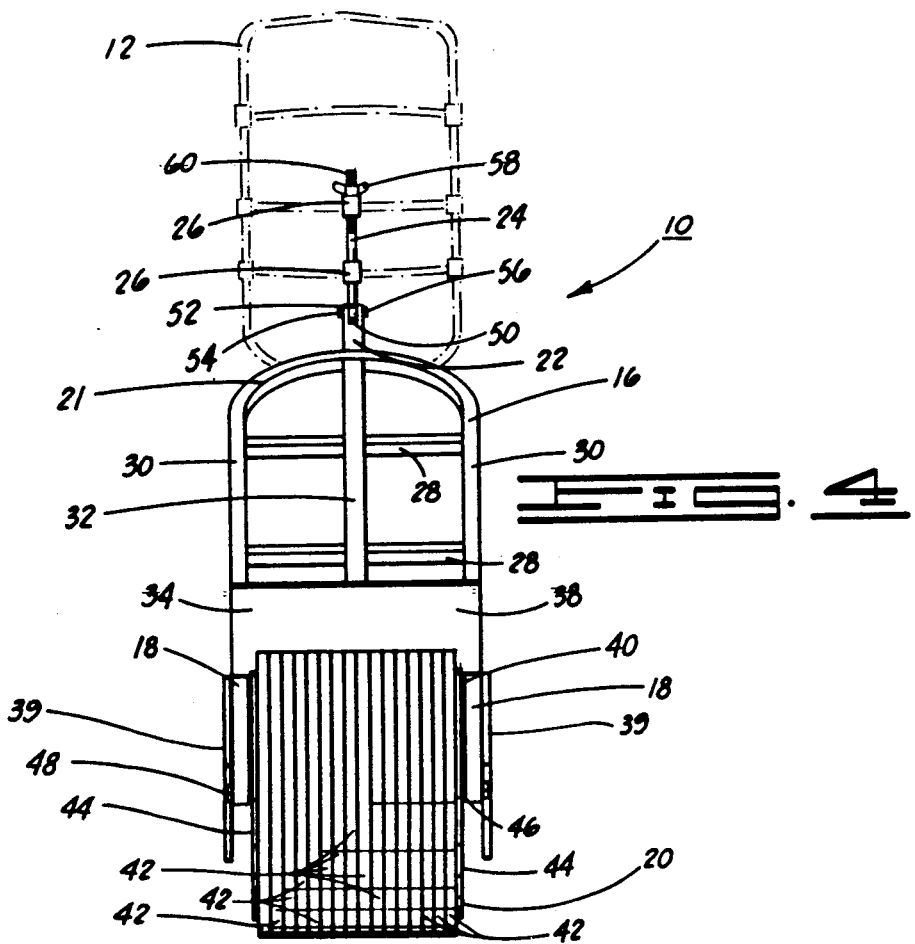

TRAVOIS WITH ROLLER ASSEMBLY

CROSS REFERENCE TO RELATED APPLICATION

This is a continuation-in-part application to U.S. patent application entitled ROLLING TRAVOIS, Ser. No. 130,078, filed Dec. 8, 1987, and now U.S. Pat. No. 4,838,565 issued June 13, 1989.

BACKGROUND OF THE INVENTION

1. Field of the Invention

The present invention relates generally to a travois for hauling supplies and the like, and more particularly but not by way of limitation, to a travois adapted for rolling behind an individual.

2. Brief Description of the Prior Art

Heretofore there have been different types of game carriers and carts pulled behind an individual using a belt or harness attachment. U.S. Pat. No. 2,624,588 to Jones and U.S. Pat. No. 2,992,834 to Tidwell et al. describe hand operated game carriers. In U.S. Pat. No. 2,613,953 to Giovannoni and in U.S. Pat. No. 4,045,040 to Fails, a harness and backpack are used for pulling a game carrier. While each of these carriers uses a wheeled frame for carrying game, the structure of the carriers is dissimilar when compared to the rolling travois of the present invention.

Various types of carts, such as a golf cart and a luggage cart, are described in U.S. Pat. No. 3,328,043 to Johnson and U.S. Pat. No. 4,236,723 to Lemmon, wherein a cart is pulled behind an individual wearing a belt attached to the cart. Further, a single wheeled cart for carrying a tree trimming apparatus is described in U.S. Pat. No. 2,655,957 to Lagant.

U.S. Pat. No. 1,040,413 to Renard teaches a support for a knapsack with a frame which supports a flexible fabric body to distribute a carried load over the wearer's back. U.S. Pat. No. 3,046,031 to Reynolds provides a beach drag having an elongated support frame with a forwardly disposed roller supporting the front end thereof.

None of these prior art teachings provides a completely satisfactory travois of the type described herein.

SUMMARY OF THE INVENTION

The present invention provides a rolling travois having an elongated support frame mounted on a wheel or roller assembly made up of a plurality of individual disks, the support frame attached to a backpack frame or a harness arrangement in order to desirably distribute the load to an individual pulling the travois.

The roller assembly comprises a plurality of disks supported on a common axle and disposed thereon to determine a selected profile of the outer periphery of the wheel assembly.

In one embodiment, the roller assembly is in the form of a solid or multiple piece spherical member rotatable on an axle extending through its center core.

An object of the invention is to provide a lightweight rolling travois having a frame mounted on a single roller and attached to a pulling harness worn by an individual for pulling the travois therebehind.

Another object of the invention is to provide a rolling travois having a single roller frame for hauling supplies and the like over various types of terrain under various weather conditions.

Yet another object of the invention is to provide a rolling travois which is supported for even load distribution via an adjustable harness attachable to an individual's back, the rolling travois being disposed to easily move up or down and left or right when pulled over rough terrain.

Still another object of the invention is to provide a rolling travois in which the center of gravity of the loaded travois is disposed essentially directly above the center of the roller, thus placing a lesser portion of the load on the individual pulling the travois and a greater portion thereof on the roller of the travois.

Other objects, advantages and features of the present invention will become clear from the following detailed description when read in conjunction with the drawings and appended claims.

BRIEF DESCRIPTION OF THE DRAWINGS

FIG. 3 is an enlarged side view of a back-pack swivel connecting rod connected to a tongue of the travois of FIG. 1.

FIG. 4 is an end view of the rolling travois of FIG. 1.

DESCRIPTION

Figure 1:
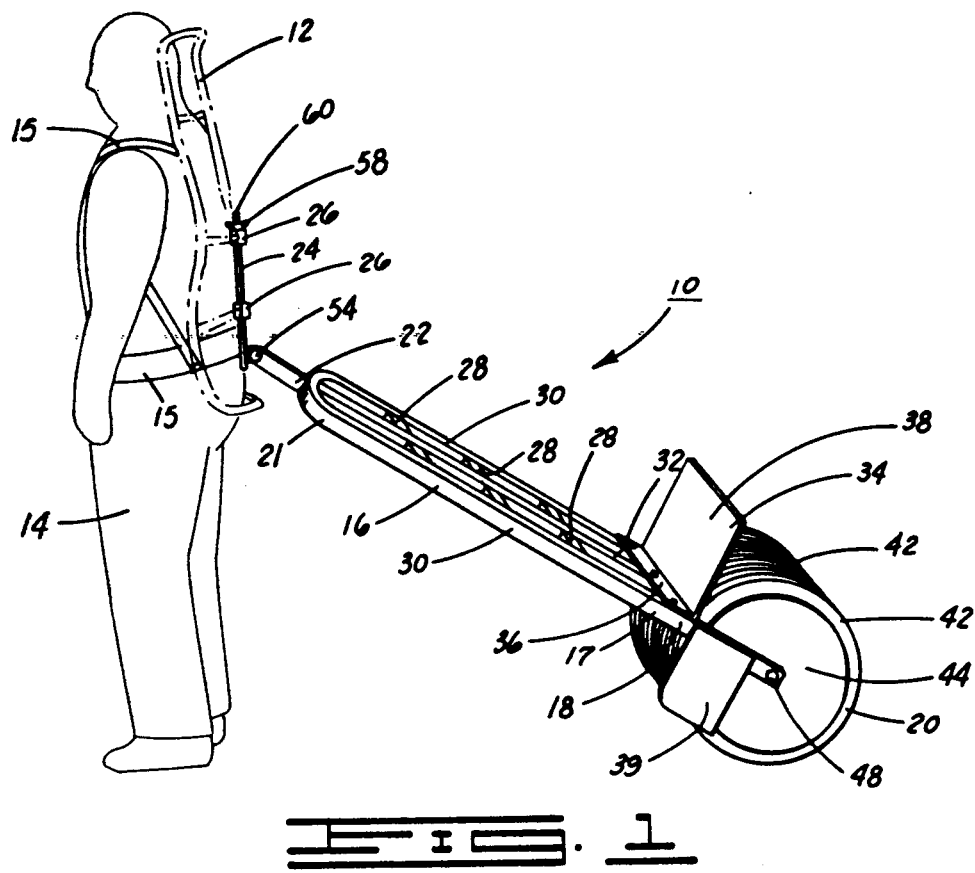
FIG. 1 is a view of a rolling travois constructed in accordance with the present invention and shown attached to an individual.

Referring now to the drawings, and more particularly to FIG. 1, shown therein is a side view of a rolling travois constructed in accordance with the present invention and designated by general reference number 10. The travois 10 is connected to a backpack frame 12 strapped to an individual 14 via a harness 15. The backpack frame 12 serves to spread the load on the back of the individual 14 when pulling the travois 10, and the waist belt and shoulder harness 15 can be any convenient arrangement of straps or the like to attach the backpack frame 12 to the individual 14.

The travois 10 includes a U-shaped lightweight metal support frame 16 with a lower open end 17 of the support frame 16 having legs 18 for receiving an enlarged wheel assembly or roller 20 therebetween. An upper end 21 of the support frame 16 includes an outwardly extending tongue 22 which is pivotally attached to a backpack swivel connecting rod 24. The connecting rod 24 is connected to the support frame 16 using upper and lower clamps 26.

The support frame 16 shown in FIGS. 1 and 4 includes a plurality of cross struts 28 joining together opposite sides 30 of the support frame 16 and a center support strap 32 extending from the upper end 21 to the lower open end 17 and attached to a portion of the top of the cross struts 28. Attached to the sides 30 and a portion of the lower end of the center support strap 32 and the lowest cross strut 28 is an L-shaped upright backstop 34. The backstop 34, shown in FIGS. 1, 2 and 4, includes a shorter horizontal flange 36 which is attached to the support frame 16, and an elongated vertical flange 38. The vertical flange 38 allows articles to be placed thereagainst when stored on top of the support frame 16 and acts as a backstop to prevent articles from slipping downward on the support frame 16 and engaging the roller 20 when the travois 10 is in use. Also, the backstop 34 prevents water or mud from splashing from the roller 20 onto stored articles on the support frame 16.

An added feature of the rolling travois 10 is the use of downwardly extending snow keels 39 attached to the legs 18. The snow keels 39 add stability to the rolling travois 10 in snow and help prevent the travois 10 from sliding sideways on side hill traverses by knifing into packed snow or crusted ice.

Referring now to FIGS. 1 and 4, the roller 20 is shown disposed in an opening 40 between the legs 18 of the support frame 16. The roller 20 is made up of a plurality of cylindrically shaped hard rubber disks 42 having the same diameter and disposed together between two metal hubs 44. The disks 42 rotate on a steel axle 46 which is preferably surrounded by a nylon bushing (not shown) received through the center of each disk 42. The axle 46 is secured to the legs 18 using bolts 48. The roller 20, made up of the disks 42, has proven to be very stable as the disks 42 apply a substantial load-bearing surface on the ground, causing the travois 10 to travel well over snow, sand and mud.

In FIG. 4 the tongue 22 is shown as having a forked end portion 50 used for pivotal attachment to a pivot support member 52 attached to the lower end of the connecting rod 24. A threaded bolt 54 is received through holes in the forked end portion 50 and through an aperture in the support member 52 and secured to a nut 56. Using the above type of connection the tongue 22 swivels up and down on the support member 52 as depicted by arrows 57 in FIG. 3, thereby allowing easy up and down movement of the travois 10 as it is pulled.

Figure 2:
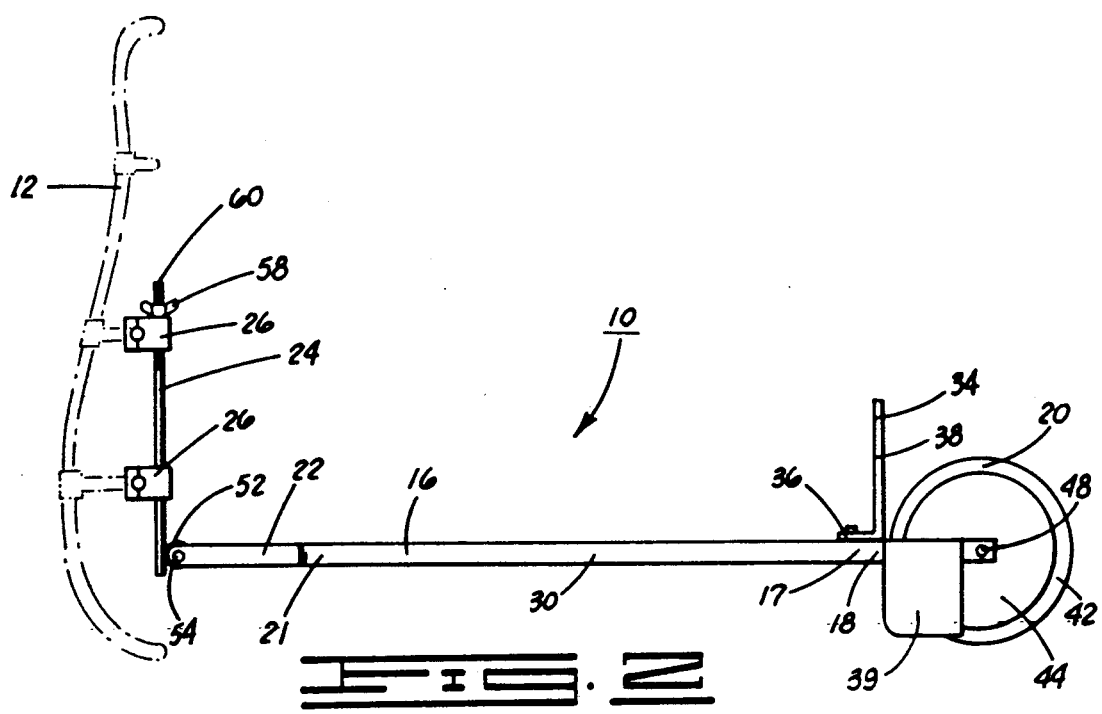
FIG. 2 is a side view of the travois of FIG. 1 with its backpack frame resting on a ground surface.

As shown in FIG. 2, the swivel connection of the tongue 22 to the backpack frame 12 permits placement of backpack frame 12 on the ground surface when the support frame 16 is lowered into a horizontal position as shown. Supplies can be placed on the support frame 16 while in its horizontal position and secured thereto using a rope or bungies as desired.

In the interest of ease in pulling the travois 10 without tiring or hurting the back of the individual 14, the angle between the horizontal ground surface and the longitudinal axis of the support frame 16 can be adjusted by raising the connecting rod 24 by tightening a wing nut 58 on a threaded end portion 60 of the connecting rod 24. By loosening the wing nut 58, which bears against a washer 58A on top of the upper clamp 26, the connecting rod 24 can be lowered. This provides for vertical adjustment of the attaching position of the upper end 21 (or tongue 22) of the support frame 16 relative to the backpack frame 12 along the longitudinal axis thereof. This adjustment will vary with the size and height of the individual 14 and the load carried on the support frame 16.

FIG. 3 illustrates an enlarged side view of the backpack swivel connecting rod 24. The clamps 26 are rigidly secured to the backpack frame 12 but allow the connecting rod 24 to pivot either to the left or right as indicated by arrow 62.

In FIG. 4 a rear view of the rolling travois 10 is shown with the tongue 22 secured to the connecting rod 24 which is secured to the rear of the backpack frame 12. In this view the multiple rubber disks 42 are shown which make up the particular configuration of the roller 20. The contour of roller 20 can be altered, if desired, by substituting different size disks 42 to make up a selected wheel profile for a particular type of terrain or ground surface on which the rolling travois 10 will be used.

Embodiment of FIGS. 5—9

Figure 5:
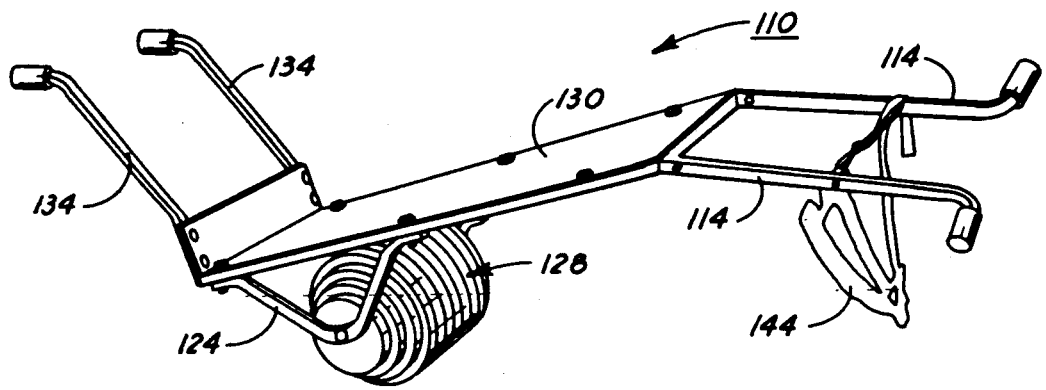
FIG. 5 is a perspective view of another embodiment of the rolling travois of the present invention.
Figure 6:
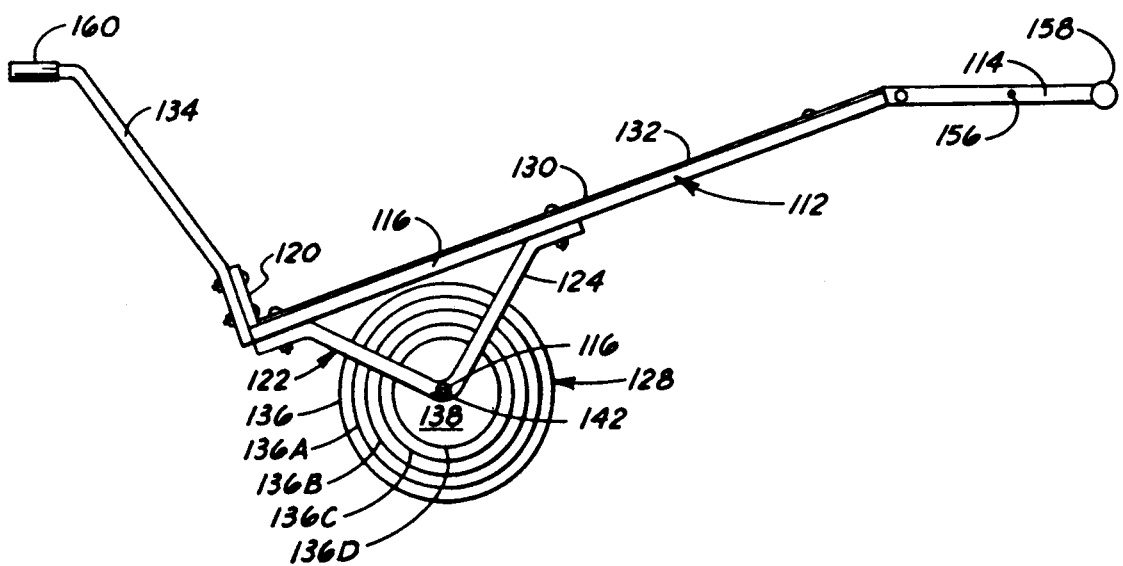
FIG. 6 is side view of the rolling travois of FIG. 5.
Figure 7:
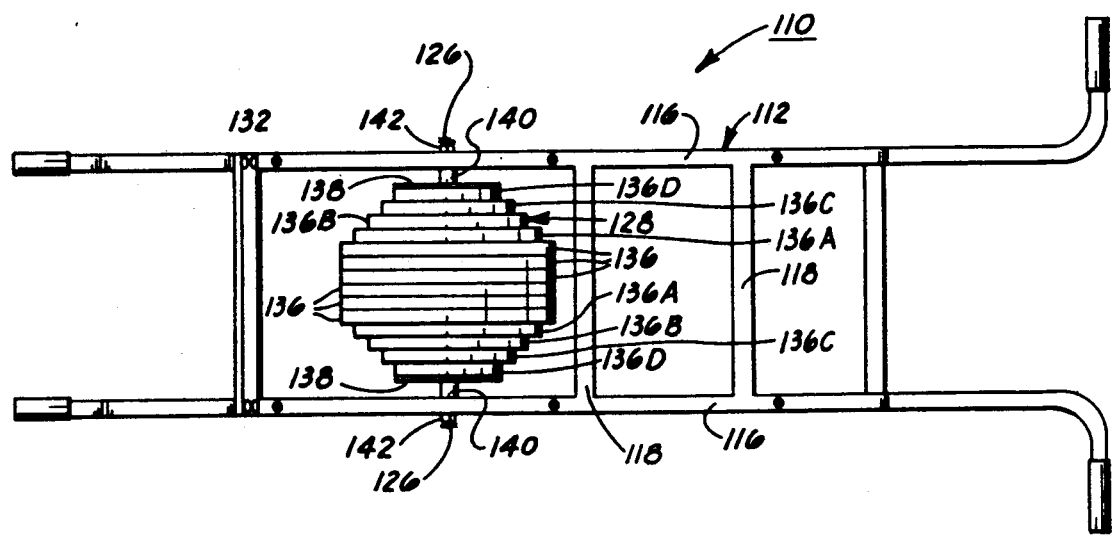
FIG. 7 is a top plan view of the rolling travois of FIG. 5 equipped with a roller comprised of a plurality of circular disks of varying diameters disposed to form a substantially spherically shaped roller.

Referring now to FIGS. 5 through 9, shown therein is another embodiment of a rolling travois 110 of the present invention. FIG. 5 is a perspective view of the rolling travois 110, while FIG. 6 and FIG. 7 are side and plan views thereof, respectively.

The travois 110 has a rectangular lightweight metal support frame 112 having two pulling handles 114 attached to and extending forwardly from the support frame 112. The support frame 112 comprises two longitudinal side pieces 116 connected by a plurality of support frame cross pieces 118 and a frame backstop 120.

On the underside of frame 112 is an undercarriage frame 122 comprising two identical undercarriage frame members 124. Each undercarriage frame member 124 is bolted to one of the support frame side pieces 116 and is disposed to support one end of a steel roller axle 126 which in turn supports a roller assembly 128. The undercarriage frame members 124 are located in such a position that a portion of the support frame 112 extends rearward beyond the vertical plane of the center of the roller assembly 128. Thus, when loaded, the center of gravity of the loaded rolling travois 110 is disposed rearward, and the effective weight which the pulling individual must lift is significantly reduced.

A lightweight metal, or semirigid plastic, planar platform 130 is bolted to the upper side 132 of the support frame 112. The frame backstop 120 extends upwardly at a right angle from the support frame 112. A pair of pushing handles 134 is attached to the frame backstop 120 to provide a convenient method of handling the travois 110 by two individuals when heavy loads are carried.

Turning to FIG. 7, depicted therein is a partial top plan view of the rolling travois 110 with the platform 130 removed to show details of the frame 112 and of the roller assembly 128. The roller axle 126 is supported by the two under carriage frame members 124 (shown in FIG. 6), each of which is bolted to the underside of one of the support frame side pieces 116. The roller axle 126 is disposed to extend through a plurality of cylindrically shaped wheel disks 136 and 136A-D of varying diameters, the wheel disks 136 and 136A-D preferably constructed of molded, semirigid plastic and disposed along the length of the axle 126 so as to provide the roller assembly 128 on external profile which is substantially spherically shaped. Nylon bushings (not shown) are disposed in a center bore of each wheel disk 136 to reduce friction and wear on the axle 126. A pair of metal wheel holding disks 138 is assembled on the outward ends of the group of wheel disks 136 and 136A-D. Hollow cylindrical spacers 140 are placed on the axle 126 so as to be disposed between the metal holding disks 138 and the undercarriage frame members 124 to maintain the roller assembly 128 centered beneath the support frame side pieces 116. Each end of axle 126 is threaded, and the axle 126 is secured to the supporting undercarriage frame 122 by means of a locking nut assembly 142.

Figure 8:
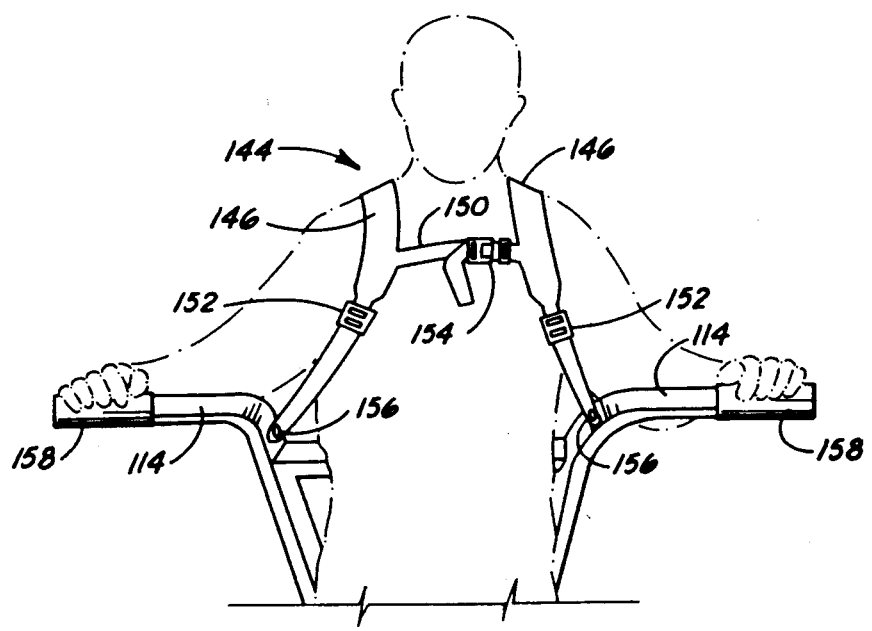
FIG. 8 is a front view of a harness for pulling the rolling travois of FIG. 5.
Figure 9:
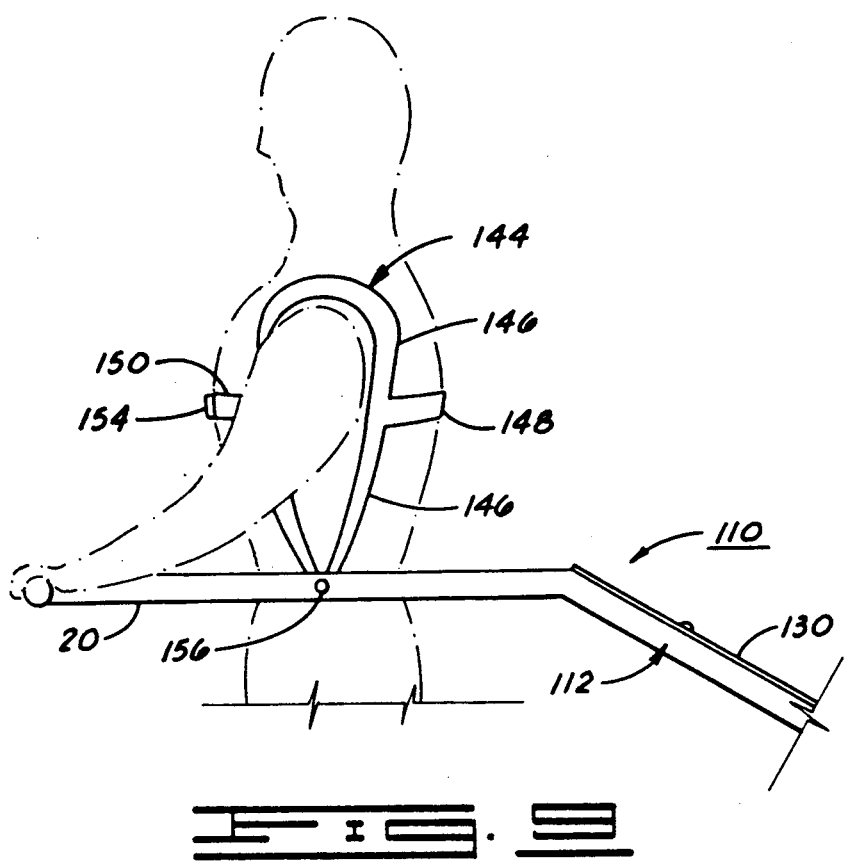
FIG. 9 is a side view of the harness arrangement of FIG. 8.

Turning now to FIGS. 8 and 9, depicted therein is a pulling harness 144 for the rolling travois 110. The harness 144 is preferably constructed of leather or flexible fabric and comprises a pair of padded shoulder straps 146 connected by a rear anti-slide strap 148 and a front anti-slide strap 150. Each shoulder strap 146 has an adjustment buckle 152, and the front anti-slide strap 150 has a release and adjustment buckle 154. The adjustment buckles 152 and 154 permit the wearer to shorten or lengthen the various straps in the harness 144 for optimum comfort.

Each shoulder strap 146 is connected by a smooth head rivet or other convenient means to one of the pulling handles 114 as shown. The distal ends of the pulling handles 114 are turned to extend away from the wearer and hand grips 158 are provided for the wearer to hold onto as the rolling travois 110 is pulled. Also, hand grips 160 (FIG. 6) are provided at the distal ends of the pushing handles 134 for gripping by a second individual to assist in moving the rolling travois 110 should an occasion require such additional assistance.

Figure 10:
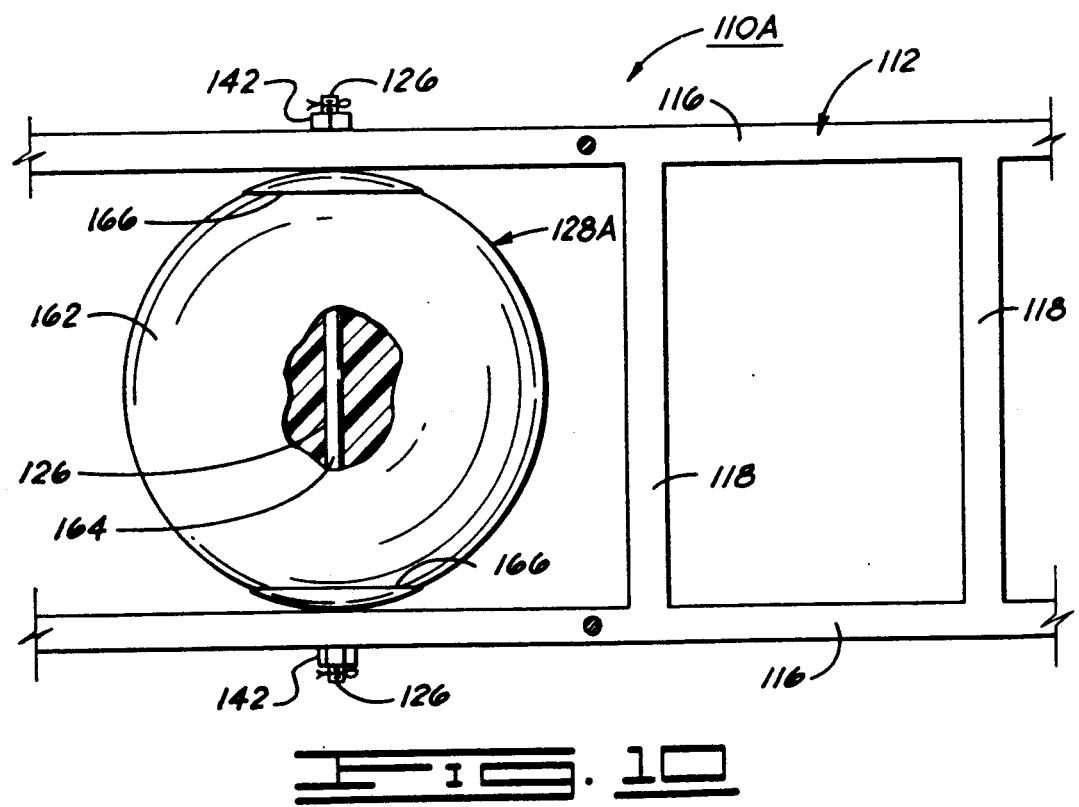
FIG. 10 is a partial top plan view of yet another embodiment of a rolling travois equipped with a spherically shaped roller.

Another embodiment of the present invention is depicted in FIG. 10 in which is shown a rolling travois 110A which is identical in construction to that of the rolling travois 110 with the exception that the wheel assembly is of a different make-up. The platform 130 is again removed in the view of FIG. 10 to disclose the wheel assembly. FIG. 10 depicts a wheel assembly 128A which comprises a ball roller 162 with a bore through its center large enough to accommodate the axle 126. A nylon bushing 164 is disposed in the bore and has an internal diameter to bearingly receive the axle 126 so as to reduce friction and wear. A pair of circular holding caps 166 having holes therein fit over opposing ends of the axle 126 and abut against the roller 162 as shown. The holding caps 166 are preferably constructed of molded plastic, and serve to center and protect the roller 162 from contact with the undercarriage support members 124. As described above, the axle 126 is secured to the undercarriage frame 122 (not shown in FIG. 10) by a lock nut assembly 142.

The provision of the ball roller 162 in the rolling travois 110A is useful for certain terrain and of a variety of materials, but is preferably a solid member made from a lightweight, low porosity polymeric or elastomeric material It will be clear that the present invention is well adapted to carry out the objects and attain the advantages mentioned as well as those inherent therein. While presently preferred embodiments of the invention has been described for purposes of this disclosure, numerous changes can be made which will readily suggest themselves to those skilled in the art and which are encompassed within the spirit of the invention disclosed and as defined in the appended claims.

What is claimed is:

1. A rolling travois for carrying camping supplies and the like, the rolling travois adapted for connection to an individual and comprising:

an elongated support frame having a forward end and a rearward end;

an enlarged roller assembly rotatably connected to the elongated support frame so as to be disposed below the support frame and near the rearward end thereof, the roller assembly comprising:

a plurality of cylindrically shaped wheel disks, each wheel disk having a centrally disposed hole therethrough;

axle means extending through the holes of the wheel disks for rollingly connecting to the wheel disks, the wheel disks having varying diameters so that the wheel disks provide the wheel assembly with a substantially spherically shaped profile; and undercarriage frame means attached to the support frame for disposing the axle means and the wheel disks below the support frame for rolling support thereof; and adjustable harness means attached to the support frame and attachable to an individual for pulling the rolling travois.

2. The rolling travois of claim 1 wherein each wheel disk has a wear resistant elastomeric bushing through which the axle means extends.

3. The rolling travois of claim 2 wherein the roller assembly further comprises a pair of wheel holding disks which are supported on the axle means with one each of the wheel holding disks disposed at a distal end of the axle means to maintain centering of the wheel disks on the axle means.

* * * * *

UNITED STATES PATENT AND TRADEMARK OFFICE
CERTIFICATE OF CORRECTION

PATENT NO.   :   5,005,844
DATED        :   April 9, 1991
INVENTOR(S)  :   George V. Douglas and Vivian T. Douglas It is certified that error appears in the above-identified patent and that said Letters Patent is hereby corrected as shown below:

Cover Page, Column 1, line 2 of the "Inventors:", delete "both of Wheat Ridge, Colo." and substitute therefor --both of Denver, Colo.--; and Column 5, line 47, after "and" and before "of" insert --weather conditions. The roller 162 can be constructed--.

Signed and Sealed this

Thirteenth Day of October, 1992

Attest:

DOUGLAS B. COMER

Attesting Officer

Acting Commissioner of Patents and Trademarks